(12) United States Patent
Yeom

(10) Patent No.: US 6,954,330 B2
(45) Date of Patent: Oct. 11, 2005

(54) DISK CHUCK

(75) Inventor: Ki-Keon Yeom, Suwon (KR)

(73) Assignee: Samsung Electronics, Co., Ltd., Suwon-Si (KR)

( * ) Notice: Subject to any disclaimer, the term of this patent is extended or adjusted under 35 U.S.C. 154(b) by 365 days.

(21) Appl. No.: 10/153,909

(22) Filed: May 24, 2002

(65) Prior Publication Data

US 2003/0103292 A1 Jun. 5, 2003

(30) Foreign Application Priority Data

Dec. 4, 2001 (KR) ........................................ 2001-76070

(51) Int. Cl.$^7$ .......................................... G11B 17/022
(52) U.S. Cl. ................................ 360/99.12; 360/98.08
(58) Field of Search ........................ 360/99.12, 98.01, 360/98.03, 98.08, 99.05; 720/706, 707, 714

(56) References Cited

U.S. PATENT DOCUMENTS

| | | | | |
|---|---|---|---|---|
| 5,025,340 A | * | 6/1991 | Peters ..................... | 360/99.12 |
| 5,048,005 A | * | 9/1991 | Ekhoff ...................... | 720/707 |
| 5,056,082 A | * | 10/1991 | Ekhoff ...................... | 720/707 |
| 5,485,328 A | * | 1/1996 | Radwan et al. .......... | 360/98.08 |
| 5,644,564 A | * | 7/1997 | Peters ....................... | 720/707 |
| 5,957,588 A | * | 9/1999 | Wahl .......................... | 384/108 |
| 6,600,628 B2 | * | 7/2003 | Kilmer ..................... | 360/99.12 |

FOREIGN PATENT DOCUMENTS

| | | | | | |
|---|---|---|---|---|---|
| JP | 62212957 A | * | 9/1987 | ......... | G11B/17/028 |
| JP | 62212958 A | * | 9/1987 | ......... | G11B/17/028 |
| JP | 04178921 A | * | 6/1992 | ............ | G11B/5/84 |
| JP | 04353663 A | * | 12/1992 | ......... | G11B/17/028 |
| JP | 05217135 A | * | 8/1993 | ............ | G11B/5/49 |
| JP | 11016236 A | * | 1/1999 | ......... | G11B/17/028 |

OTHER PUBLICATIONS

"Holographic Disk Clamping Device," May 1, 1989, IBM Technical Disclosure Bulletin, vol. 31, Iss. No. 12, pp. 300–301.*

"Pneumatic Flat Plate Stock Carrier," Sep. 1, 1977, IBM Technical Disclosure Bulletin, vol. 20, Iss. No. 4, pp. 1557–1558.*

Jeffrey K. Loton, Servo Writer, Jan. 14, 2000, Japanese Abstract 2000–011569.

* cited by examiner

Primary Examiner—William J Klimowicz
(74) Attorney, Agent, or Firm—Staas & Halsey LLP

(57) ABSTRACT

A disk chuck which centers and clamps data storage disks during a disk formatting process. The disk chuck is designed to clamp or unclamp the disks at the same time. The disk chuck includes a hollow main shaft which orderly fits and seats the disks thereon and a piston which is situated in the hollow main shaft so as to axially move in the hollow main shaft in opposite directions. A clamping shaft is axially received in the hollow main shaft and coupled to the piston so as to move along with the piston in the same direction to clamp or unclamp the disks seated on the hollow main shaft. An upper end of the clamping shaft having a disk clamping part extends to project beyond an upper end of the hollow main shaft.

24 Claims, 6 Drawing Sheets ized fluid is removed from the cylindrical first

DISK CHUCK

CROSS-REFERENCE TO RELATED APPLICATIONS

This application claims the benefit of Korean Application No. 2001-76070, filed Dec. 4, 2001, in the Korean Patent Office, the disclosure of which is incorporated herein by reference.

BACKGROUND OF THE INVENTION

1. Field of the Invention

The present invention relates to disk chucks which center and clamp data storage disks and, more particularly, to a disk chuck designed to clamp or unclamp a plurality of disks at the same time.

2. Description of the Prior Art

In general, data storage disks such as magnetic disks for hard disk drives (HDD) of computers store data and programs thereon for a later retrieval. However, it is impossible to store data or programs on such disks unless they are formatted after they are manufactured. During a disk formatting process, tracks are densely formed on a disk and are sectored, thus allowing the disk to effectively store the data and programs.

In an effort to quickly perform such a disk formatting process and to improve the efficiency of performing the process, the disk formatting process is typically performed at a pre-assembly operation prior to assembling the hard disk drives (HDD) on an HDD production line. In addition, a disk chuck which centers and clamps disks is designed and used to center and clamp the disks at the same time, so as to simultaneously format the disks during a formatting process.

FIG.1 shows a conventional disk chuck used in a disk formatting process disclosed by a Japanese Patent Laid-open Publication No. 2000-11569. The conventional disk chuck comprises a mandrel 3 coupled to a receiver plate 2 of a spindle motor 1. A pin 5 is axially fitted in a central bore of the mandrel 3 so as to extend upward to a predetermined height in a vertical direction. A plurality of disks 4 are fitted over the pin 5 to be stacked in the vertical direction. A plurality of spacers 6 are fitted over the pin 5 at corresponding positions between the disks 4 and space the disks 4 from each other by a predetermined parallel gap. The disk chuck also has a disk clamp 8, which is screwed to a top end of the pin 5 using a setscrew 7 which clamps the disks 4.

In order to clamp the disks 4 using the disk chuck, the disks 4 and the spacers 6 are alternately fitted over the pin 5 of the mandrel 3 to the top end of the pin 5 prior to clamping the disks 4 by screwing the clamp 8 to the top end of the pin 5. After clamping the disks 4, the spindle motor 1 is turned on to rotate the disks 4, thus performing a disk formatting process. After the completion of the disk formatting process, the clamp 8 is removed from the top end of the pin 5 by loosening the setscrew 7, thus unclamping both the disks 4 and the spacers 6. The disks 4 and the spacers 6 are, thereafter, removed from the pin 5. After removing the formatted disks 4, new disks are clamped on the disk chuck so as to be subjected to the same formatting process.

However, with a conventional disk chuck, an operator must manually mount and remove the clamp 8 to and from the top end of the pin 5 by tightening and loosening the setscrew 7. This labor-intensive process is repeated for each disk formatting process and makes the conventional disk chuck inconvenient to use.

In addition, a circumferential surface of the pin 5 is abraded due to a repeated disk clamping operation. Therefore, the pin 5 may fail to precisely center the disks 4, causing an error during a disk formatting process.

SUMMARY OF THE INVENTION

Accordingly, it is an object of the present invention to provide a disk chuck which allows an operator to easily and simply clamp and unclamp a plurality of disks during a disk formatting process.

It is another object of the present invention to provide a disk chuck which precisely centers a plurality of disks as the disk chuck clamps the disks.

Additional objects and advantages of the invention will be set forth in part in the description which follows, and, in part, will be obvious from the description, or may be learned by practice of the invention.

To achieve the above and other objects of the present invention, there is provided a disk chuck comprising a hollow main shaft which seats and receives disks thereon so as to have the disks fitted over the hollow main shaft, a piston which is received in the hollow main shaft and axially moves in the hollow main shaft in opposite directions, and a clamping shaft which is axially received in the hollow main shaft, coupled to the piston and moves along with the piston in the same direction, wherein an upper end of the clamping shaft is projected from the hollow main shaft and includes a disk clamping part which selectively clamps and unclamps the disks seated on the hollow main shaft.

The hollow main shaft comprises a large diameter part having a predetermined outer diameter and includes a cylindrical first bore formed therein which movably receives the piston therein, and a small diameter part having an outer diameter smaller than that of the large diameter part so as to allow the disks to be fitted over the small diameter part, and includes a cylindrical second bore formed therein which movably receives the clamping shaft.

The piston is moved in the cylindrical first bore by pressurized fluid which is fed into the cylindrical first bore.

A piston restoring spring is set in the cylindrical first bore which returns the piston to an original position of the piston as the pressurized fluid is removed from the cylindrical first bore.

According to an aspect of the present invention, the disk clamping part comprises a skirt part which extends from the upper end of the clamping shaft toward the upper end of the hollow main shaft by a predetermined length and includes an outer diameter which is larger than that of the clamping shaft, and slits which are formed on the skirt part in a radial direction and allow the outer diameter of the skirt part to be changeable wherein the upper end of the hollow main shaft includes a chamfered surface which allows the skirt part to expand to enlarge the outer diameter of the skirt part and to compress the disks fitted over the hollow main shaft during a downward movement of the clamping shaft.

According to another aspect of the present invention, the disk clamping part comprises an elastic deformable tubular part which extends in an axial direction of the clamping shaft to a predetermined length and includes slits which are axially formed on a sidewall of the elastic deformable tubular part, a flange part which extends from an upper end of the elastic deformable tubular part in a radial direction, and a skirt part which extends from an outer edge of the flange part toward an upper end of the hollow main shaft by a predetermined length, wherein the upper end of the hollow main shaft includes a chamfered surface which allows the skirt part to expand to enlarge the outer diameter of the skirt part and to compress the disks fitted over the hollow main shaft during a downward movement of the clamping shaft.

According to yet another aspect of the present invention, the disk chuck further comprises one or more spacers which are fitted over the hollow main shaft at corresponding positions between the disks so as to space the disks apart from each other.

Each of the spacers comprises an outside member which includes a seat opening having a stepped inner surface, an inside member which is movably seated in the outside member so as to be retractable relative to the outside member and includes an external top surface having a tapered disk seat surface which fits and centers a corresponding one of the disks, a spring which is set between the inside and outside members and biases the inside member relative to the outside member so as to normally expose the tapered disk seat surface of the inside member outside the outside member, and a stop ring which is set in the seat opening of the outside member and prevents a removal of the inside member from the outside member.

According to an additional aspect of the present invention, the disk chuck further comprises a top cover which covers an uppermost disk of the disks fitted over the hollow main shaft.

BRIEF DESCRIPTION OF THE DRAWINGS

The above and other objects, features and advantages of the present invention will become more apparent and more readily appreciated by describing in detail preferred embodiments thereof with reference to the accompanying drawings, in which.

DETAILED DESCRIPTION OF THE INVENTION

Figure 1:
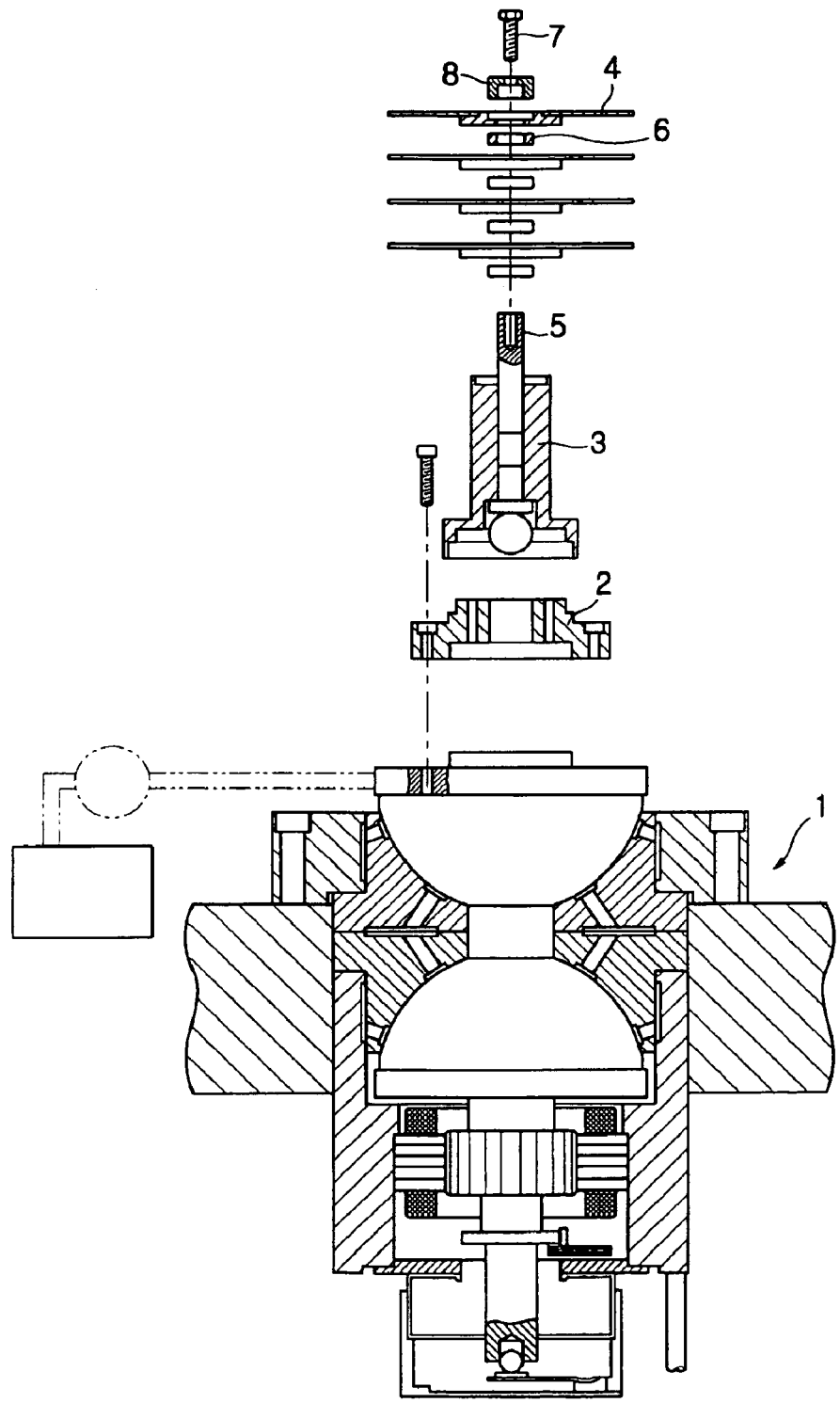
FIG. 1 is an exploded sectional view showing the construction of a conventional disk chuck with a plurality of disks being removed from the disk chuck.
Figure 2:
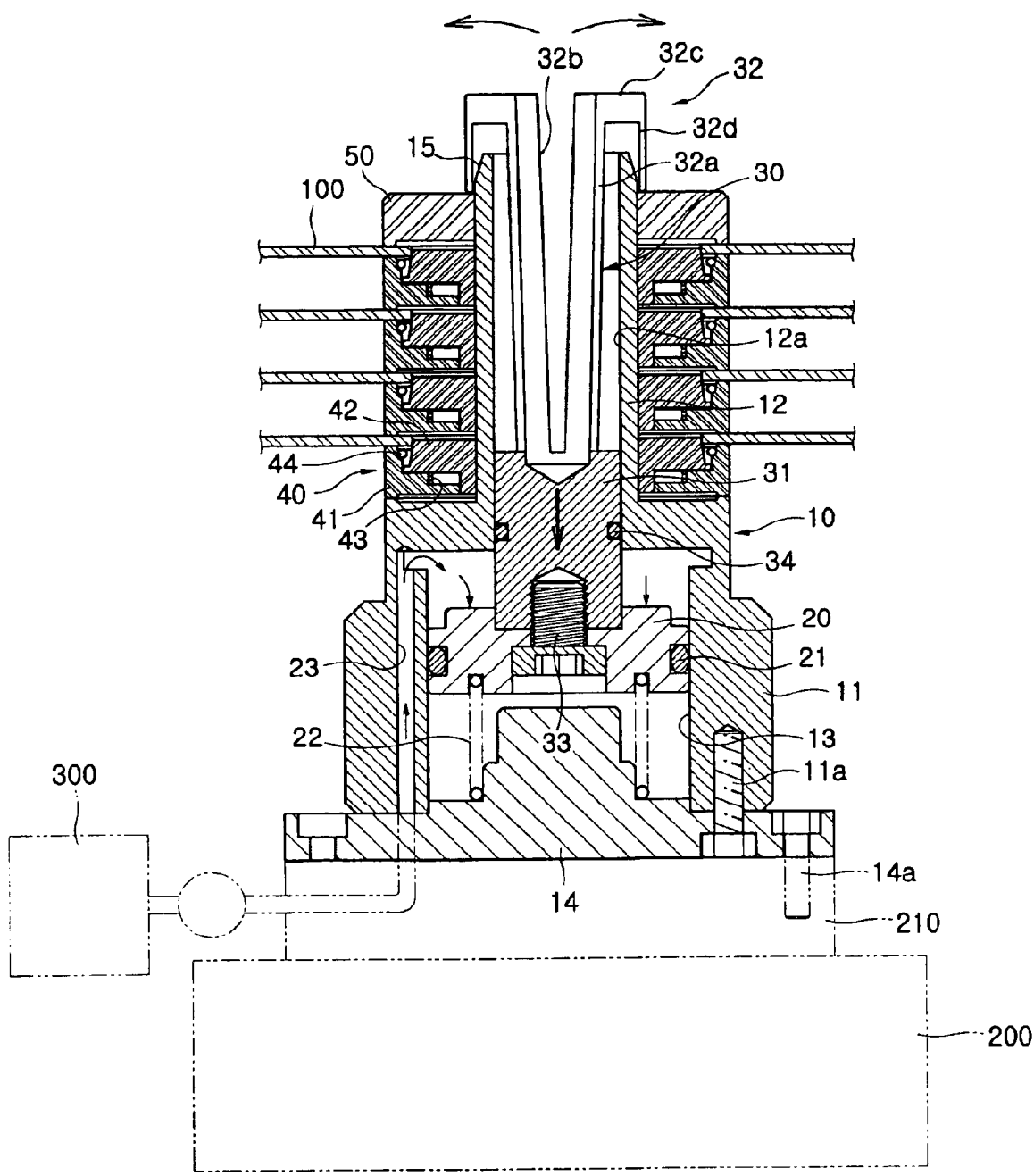
FIG. 2 is a sectional view showing the construction of a disk chuck according to an embodiment of the present invention with a plurality of disks clamped to the disk chuck.

Reference will now be made in detail to the present preferred embodiments of the present invention, examples of which are illustrated in the accompanying drawings, wherein like reference numerals refer to like elements throughout FIG. 2 shows the construction of a disk chuck according to an embodiment of the present invention. The disk chuck comprises a hollow main shaft 10 which is coupled to a rotating shaft 210 of a spindle motor 200 and seats disks 100 thereon so as to orderly fit the disks 100 over the hollow main shaft 10. The disk chuck further comprises a disk clamping unit which clamps the disks 100 that are fitted over the hollow main shaft 10, a plurality of spacers 40 which allow the disks 100 to be regularly spaced apart from each other and precisely centered on the hollow main shaft 10 as the disks 100 are clamped on the hollow main shaft 10, and a top cover 50 which covers a portion of an uppermost disk of the disks 100 when the disks 100 are clamped on the hollow main shaft 10. The disk clamping unit includes an actuating piston 20 and a clamping shaft 30.

The hollow main shaft 10 has a large diameter which allows the hollow main shaft 10 to rotate in a stable manner during an operation of the disk chuck. The hollow main shaft 10 includes a large diameter lower part 11 which couples the hollow main shaft 10 to the rotating shaft 210 of the spindle motor 200, and a small diameter upper part 12 which extends from the top of the large diameter lower part 11 to a predetermined height and allows the disks 100 to be regularly fitted thereon.

A cylindrical first bore 13 is formed in the large diameter lower part 11 of the hollow main shaft 10, and receives the actuating piston 20 therein so as to have the actuating piston 20 movable in a vertical direction in the cylindrical first bore 13. A disc-shaped coupling plate 14 is mounted to a lower end of the large diameter lower part 11 of the hollow main shaft 10 so as to close a lower end of the cylindrical first bore 13 and couple the large diameter lower part 11 to the rotating shaft 210 of the spindle motor 200. The disk-shaped coupling plate 14 is removably attached to both the large diameter lower part 11 of the hollow main shaft 10 and the rotating shaft 210 of the spindle motor 200 using, for example, a plurality of setscrews 11a and 14a.

A first sealing ring 21, so-called an "O-ring", is fitted over a circumferential surface of the actuating piston 20, which is movably set in the cylindrical first bore 13 of the hollow main shaft 10, and provides an airtight seal to a gap between the actuating piston 20 and an internal surface of the cylindrical first bore 13. A piston restoring spring 22 is set in the cylindrical first bore 13 at a position between a lower end of the piston 20 and an upper end of the disc-shaped coupling plate 14, and normally biases the actuating piston 20 upward in the cylindrical first bore 13. An air passage 23 is axially formed in a sidewall of the large diameter lower part 11 of the hollow main shaft 10, communicates with an upper chamber of the cylindrical first bore 13 and selectively feeds, for example, pressurized air from an external air supply source 300 into the upper chamber of the cylindrical first bore 13. As the pressurized air is fed from the air supply source 300 into the upper chamber of the cylindrical first bore 13 through the air passage 23, the actuating piston 20 is moved downward in the cylindrical first bore 13. As the pressurized air is removed from the upper chamber of the cylindrical first bore 13, the actuating piston 20 is moved upward in the cylindrical first bore 13 to its original position by the restoring force of the piston restoring spring 22.

While the actuating piston 20 is moved in a vertical direction by an inflow and outflow of the pressurized air, it should be understood that the vertical movement of the actuating piston 20 may be accomplished by a pressurized fluid, such as a pressurized oil. Accordingly, the external air supply source 300 is replaced with an oil pump to feed the pressurized oil into the upper chamber of the cylindrical first bore 13 through the air passage 23, which now doubles as an oil passage.

The clamping shaft 30 of the disk clamping unit is axially set in a cylindrical second bore 12a formed in the small diameter upper part 12 of the hollow main shaft 10. The clamping shaft 30 is movable in a vertical direction in the cylindrical second bore 12a.

Figure 3:
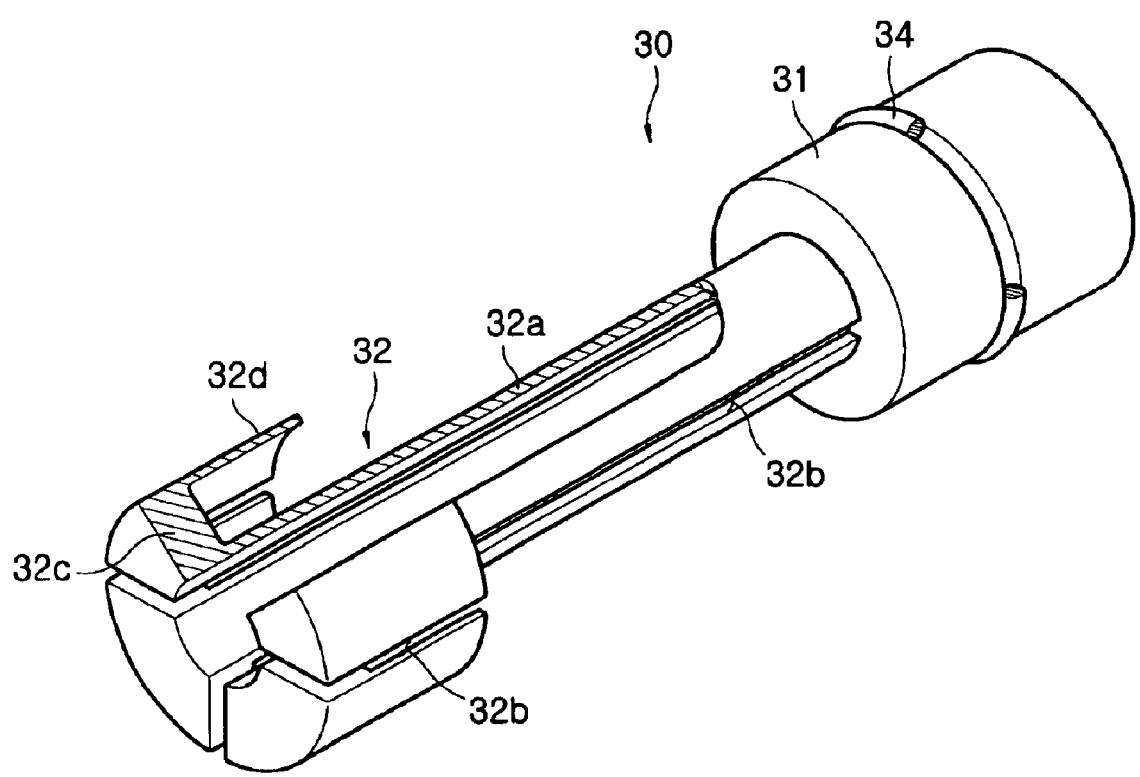
FIG. 3 is a partially broken perspective view of a clamping shaft of the disk chuck according to the embodiment shown in FIG. 2.

FIG. 3, with reference to FIG. 2, shows that the clamping shaft 30 comprises a guide part 31 and a disk clamping part 32. The guide part 31 forms the lower part of the clamping shaft 30, and is coupled to the actuating piston 20 at its lower end so as to move together with the actuating piston 20. The guide part 31 is guided in the cylindrical second bore 12a during a vertical movement of the clamping shaft 30. The disk clamping part 32 extends upward from the guide part 31 to a predetermined height so as to have its upper end project beyond an upper end of the hollow main shaft 10 and clamp the disks 100 fitted over the small diameter upper part 12 of the hollow main shaft 10.

To provide a smooth vertical movement of the clamping shaft 30 in the cylindrical second bore 12a of the hollow main shaft 10, the guide part 31 of the clamping shaft 30 has a substantial length, and an outer diameter which corresponds to an inner diameter of the cylindrical second bore 12a. A lower end of the guide part 31 is removably attached to the actuating piston 20 using, for example, a setscrew 33. A second sealing ring 34, that is, an "O-ring," is fitted over a circumferential surface of the guide part 31 and provides an airtight seal to a gap between the guide part 31 and an internal surface of the cylindrical second bore 12a.

The disk clamping part 32 includes an elastic deformable tubular part 32a which extends upward from the guide part 31 until its upper end projects from the upper end of the hollow main shaft 10. The elastic deformable tubular part 32a is axially slit along its sidewall at predetermined intervals so as to have a plurality of axial slits 32b which allow the disk clamping part 32 to be elastically deformed. A flange part 32c is formed at the upper end of the elastic deformable tubular part 32a by bending the upper end of the elastic deformable tubular part 32a outward in a radial direction. A cylindrical skirt part 32d extends downward from an outer edge of the flange part 32c to a predetermined length while defining an annular space between the elastic deformable tubular part 32a and the cylindrical skirt part 32d. The axial slits 32b are formed throughout the tubular part 32a, the flange part 32c and the cylindrical skirt part 32d.

Figure 4:
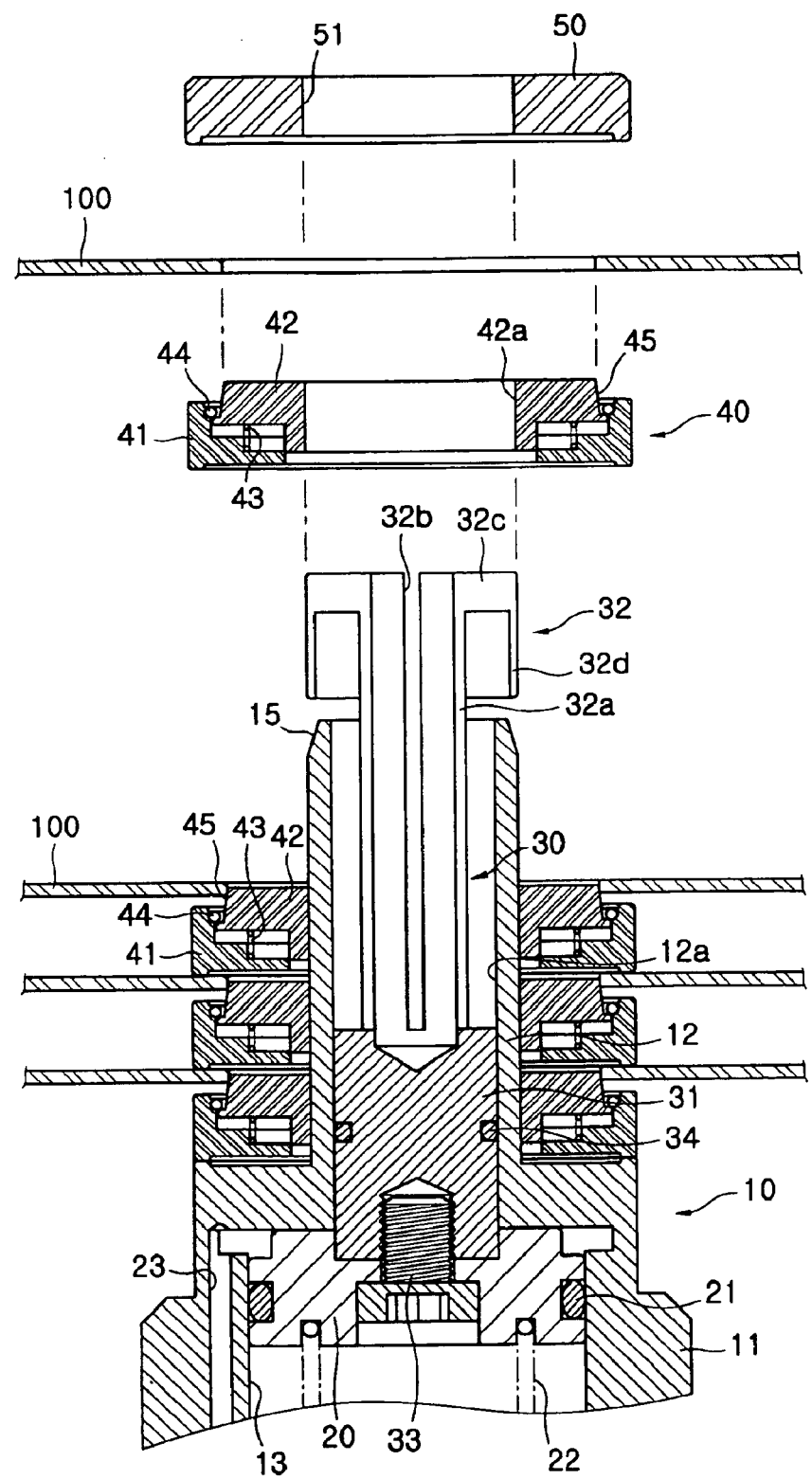
FIG. 4 is an exploded partial sectional view of the disk chuck according to the embodiment shown in FIG. 2 during a process of unclamping and removing the disks from the disk chuck.

FIG.4 shows that the outer diameter of the cylindrical skirt part 32d is less than the outer diameter of the small diameter upper part 12 of the hollow main shaft 10 so as to allow the spacers 40, disks 100 and the top cover 50 to smoothly pass over the cylindrical skirt part 32d prior to being fitted over the small diameter upper part 12.

The upper end of the small diameter upper part 12 of the hollow main shaft 10, which comes into contact with the cylindrical skirt part 32d of the disk clamping part 32, is chamfered along its outer edge, thus having a chamfered surface 15. Due to the chamfered surface 15, the cylindrical skirt part 32d elastically expands and enlarges its outer diameter as it is fitted over the upper end of the hollow main shaft 10 and compresses the top cover 50 with a downward movement of the clamping shaft 30. That is, the outer diameter of a top end of the chamfered surface 15 is smaller than the inner diameter of the cylindrical skirt part 32d. Therefore, a lower edge of the cylindrical skirt part 32d is moved down along the chamfered surface 15 as the diameter of the cylindrical skirt part 32d is enlarged during a downward movement of the disk clamping part 32.

Figure 5:
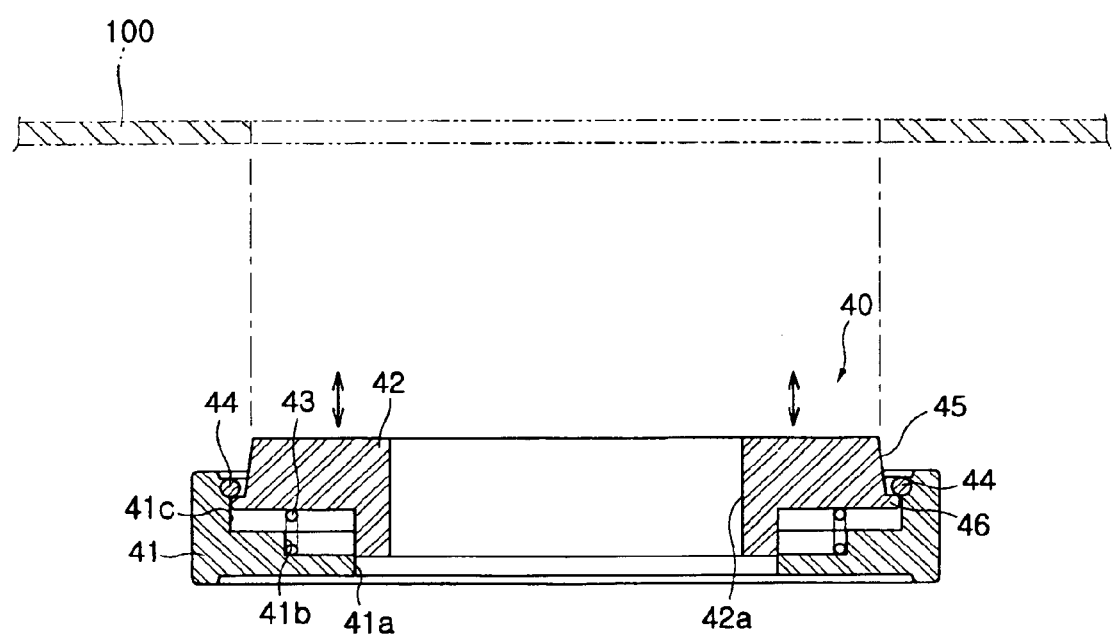
FIG. 5 is a sectional view of a spacer of the disk chuck according to the embodiment shown in FIG. 2.

FIG. 5 shows a sectional view of the spacers 40. The spacers 40, which are disposed between the disks 100 and space the disks 100 apart from each other, comprise an outside member 41 and an inside member 42, both having an annular shape. The inside member 42 is movably seated in the outside member 41, and a spring 43 is set between the two annular outside and inside members 41 and 42 to normally bias the inside member 42 upward so as to have the inside member 42 elastically retractable in a vertical direction relative to the outside member 41. A stop ring 44 is interposed between the outside and inside members 41 and 42 to limit an uppermost position of the inside member 42 relative to the outside member 41.

To seat the inside member 42 in the outside member 41, a seat opening having a stepped inner surface is formed at the center of the outside member 41. In such a case, the diameter of the seat opening is increased in a direction from the bottom to the top of the outside member 41 due to the stepped structure of the opening. Therefore, the seat opening includes, relatively to each other, a first inner surface 41a with a small diameter, a second inner surface 41b with a medium diameter, and a third inner surface 41c with a large diameter.

A fitting opening 42a, having a diameter which corresponds to the outer diameter of the small diameter upper part 12 of the hollow main shaft 10, is formed at the center of the inside member 42. A circumferential surface of the inside member 42 is also stepped to form a small diameter part of the inside member 42 which corresponds to the first inner surface 41a of the outside member 41, and a large diameter part of the inside member 42 which corresponds to the third inner surface 41c. Accordingly, the inside member 42 is movably seated in the seat opening of the outside member 41 while being normally biased upward by the spring 43. An external surface of the large diameter part of the inside member 42 is tapered to form a disk seat surface 45, which allows a corresponding one of the disks 100 to be fitted thereon while being centered during a disk clamping process. An annular flange 46 is formed along a circular lower edge of the disk seat surface 45. The outer diameter of the annular flange 46 corresponds to the inner diameter of the third inner surface 41c of the outside member 41. The stop ring 44 is seated along an upper portion of the third inner surface 41c of the outside member 41 so as to prevent an undesired removal of the inside member 42 from the outside member 41.

The spring 43 interposed between the inside and outside members 41 and 42 is, for example, a conventional compression coil spring which normally biases the inside member 42 upward relative to the outside member 41. Since the inside member 42 is biased upward by the spring 43, the disk seat surface 45 of the inside member 42 is exposed outside the upper end of the outside member 41. The corresponding one of the disks 100 is fitted over the disk seat surface 45 to be clamped and centered on the disk chuck. As the cylindrical skirt part 32d of the clamping shaft 30 (FIG. 4) is pulled downward after the corresponding one of the disks 100 is fitted over the disk seat surface 45 of the spacer 40, the corresponding one of the disks 100 is precisely centered and stably clamped due to a restoring force of the spring 43.

As shown in FIG.4, the top cover 50 covers the uppermost disk of the disks 100 as it clamps the disks 100 on the hollow main shaft 10. The top cover 50 includes a central opening 51 having a diameter which corresponds to the outer diameter of the small diameter upper part 12 of the hollow main shaft 10. The outer diameter of the top cover 50 is the same as the outer diameter of the outer member 41 of the spacer 40. The top cover 50 is compressed at its upper surface by the cylindrical skirt part 32d of the clamping shaft 30. The top cover 50 clamps the disks 100 in a stable manner and prevents damage to the disks 100.

The operational effect of the disk chuck of the present invention will be described below with reference to FIGS. 2 through 4.

With the spindle motor 200 at rest and an absence of the pressurized air in the upper chamber of the cylindrical first bore 13 of the hollow main shaft 10, the actuating piston 20 inside the cylindrical first bore 13 is placed in its uppermost position by the biasing force of the piston restoring spring 22. In such a case, the clamping shaft 30 which is operated in conjunction with the actuating piston 20 is also placed at its uppermost position, and the cylindrical skirt part 32d of the clamping shaft 30 is spaced apart from the chamfered surface 15 of the hollow main shaft 10 and is elastically closed by the elasticity of the elastic deformable tubular part 32a. Therefore, the outer diameter of the cylindrical skirt part 32d is equal to or smaller than the outer diameter of the small diameter upper part 12 of the hollow main shaft 10. Accordingly, a user can alternately fit the disks 100 and the spacers 40 over the hollow main shaft 10 to center and clamp the disks 100.

For example, a first one of the spacers 40 is fitted over the hollow main shaft 10, and a first one of the disks 100 is fitted over the hollow main shaft 10 to be positioned on the first one of the spacers 40. This operation is repeated until a desired number of the disks 100 and the spacers 40 are alternately fitted over the hollow main shaft 10. The top cover 50 is fitted over the hollow main shaft 10 to be positioned on the uppermost disk of the disks 100. As described above, with each of the spacers 40, the tapered disk seat surface 45 is projected outside the upper end of the outer member 41 by the restoring force of the spring 43. Therefore, the user can easily seat a corresponding one of the disks 100 on the projected disk seat surfaces 45 of the spacers 40. That is, the disks 100 are naturally centered as they are fitted over the disk seat surfaces 45 of the spacers 40. Since the inside member 42 is placed in its uppermost position relative to the outside member 41 by the restoring force of the spring 43, a lower surface of the corresponding one of the disks 100 is spaced apart from an upper surface of the outside member 41.

To clamp the disks 100 on the disk chuck, the external air supply source 300 is operated to feed the pressurized air to the upper chamber of the cylindrical first bore 13 of the hollow main shaft 10. This operation moves the actuating piston 20 and the clamping shaft 30 downward to clamp the disks 100 on the hollow main shaft 10 at the same time. That is, the pressurized air from the air supply source 300 passes through the air passage 23, and is introduced into the upper chamber of the cylindrical first bore 13 to bias the upper surface of the actuating piston 20 in the cylindrical first bore 13 downward, thus moving the actuating piston 20 and the clamping shaft 30 downward. As the clamping shaft 30 moves downward, the cylindrical skirt part 32d of the clamping shaft 30 is brought into contact with the chamfered surface 15 of the hollow main shaft 10, and is moved downward along the chamfered surface 15 while elastically expanding to increase its outer diameter. As the cylindrical skirt part 32d is fully moved downward, the lower edge of the cylindrical skirt part 32d compresses the upper surface of the top cover 50. Such an elastic deformation of the cylindrical skirt part 32d is caused by the elasticity of the elastic deformable tubular part 32a.

The pressing force of the cylindrical skirt part 32d is transmitted to a lowermost one of the spacers 40 through the disks 100 and the spacers 40 alternately fitted over the hollow main shaft 10. Therefore, the disks 100 are clamped on the disk chuck at the same time with the springs 43 of the spacers 40 compressed. In such a case, the disks 100 are stably clamped while being compressed at their upper and lower surfaces by the outside members 41 of the spacers 40 interposed between the disks 100. In addition, the inside members 42 of the spacers 40 are biased upward by the springs 43 set in the spacers 40, so the disks 100 are precisely centered on the disk chuck. After clamping and centering the disks 100 on the disk chuck, the spindle motor 200 is rotated to turn the disks 100, thus performing a desired disk formatting process.

After the disk formatting process is finished, the formatted disks 100 and the spacers 40 are removed from the disk chuck. To remove the disks 100 from the disk chuck, the pressurized air is removed from the upper chamber of the cylindrical first bore 13, thus allowing the actuating piston 20 and the clamping shaft 30 to move upward by the restoring force of the piston restoring spring 22. Accordingly, the disks 100 are unclamped and the cylindrical skirt part 32d of the clamping shaft 30 is moved upward to be spaced apart from the chamfered surface 15 of the hollow main shaft 10. The cylindrical skirt part 32d also elastically closes and obtains its original outer diameter due to a restoring force of the elastic deformable tubular member 32a. Therefore, it is possible to easily and simply remove the formatted disks 100 and the spacers 40 from the small diameter upper part 12 of the hollow main shaft 10. After removing the formatted disks 100 and the spacers 40 from the hollow main shaft 10, new disks 100 may be clamped and centered on the disk chuck with the spacers 40 interposed between the disks 100 prior to performing another disk formatting process.

Figure 6:
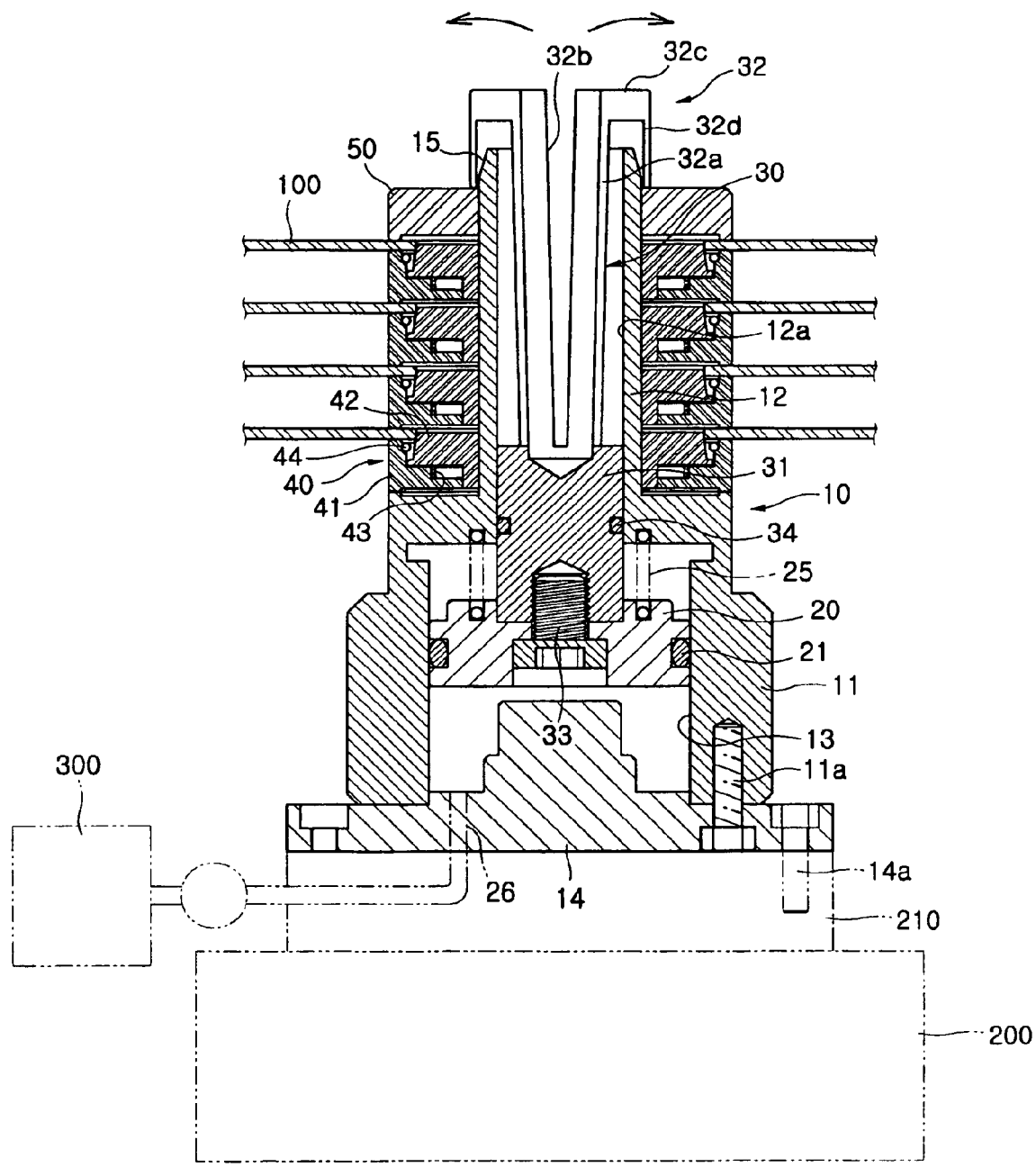
FIG. 6 is a sectional view showing the construction of a disk chuck according to another embodiment of the present invention with a plurality of disks clamped to the disk chuck.

FIG. 6 shows a sectional view illustrating the construction of a disk chuck according to another embodiment of the present invention In this case, a piston restoring spring 25 is set in an upper chamber of a cylindrical first bore 13 of a hollow main shaft 10 and an air passage 26 extends from an external air supply source 300 to a lower chamber of the cylindrical first bore 13. Accordingly, the actuating piston 20 and a clamping shaft 30 of this embodiment are moved downward by a restoring force of the piston restoring spring 25 to clamp and center disks 100 fitted over a small diameter upper part 12 of the hollow main shaft 10. To unclamp the disks 100 from the hollow main shaft 10, pressurized air is fed from the air supply source 300 into a lower chamber of the cylindrical first bore 13 through the air passage 26, and pushes a lower surface of the actuating piston 20 upward, thus moving the actuating piston 20 and the clamping shaft 30 upward to their original positions. To avoid repetition, the remaining components of the disk chuck according to the embodiment shown in FIG. 6 will not be described because they are the same as shown in the disk chuck according to the embodiment shown in FIG. 2.

As described above, the present invention provides a disk chuck which clamps and centers disks at the same time. The disk chuck includes a clamping shaft having a skirt part, which is vertically manipulated to clamp or unclamp the disks at the same time. Therefore, the disk chuck according to the present invention allows a user to easily and quickly clamp or unclamp a desired number of disks within a short period of time during a disk formatting process.

The disk chuck of the present invention further includes spacers. Each of the spacers comprises a tapered disk seat surface which is elastically biased upward by a spring. Therefore, the disks are stably clamped on the disk chuck while being precisely centered.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A disk chuck which accommodates disks, comprising:
   a hollow main shaft which seats and receives the disks so as to have the disks fitted over the hollow main shaft;
   a piston which is received in the hollow main shaft and axially moves in the hollow main shaft in opposite directions; and
   a clamping shaft which is axially received in the hollow main shaft, coupled to the piston and moves along with the piston in the same direction so as to clamp and unclamp the disks, wherein an upper end of the clamping shaft is projected from the hollow main shaft and includes a disk clamping part which selectively clamps and unclamps the disks seated on the hollow main shaft, wherein:
   the disk clamping part includes a skirt part; and
   the disk clamping part further comprises slits which are formed on the skirt part in a radial direction and allow the outer diameter of the skirt part to be changeable.

2. The disk chuck according to claim 1, wherein the hollow main shaft comprises:
   a large diameter part having an outer diameter and includes a cylindrical first bore formed therein which movably receives the piston; and
   a small diameter part having an outer diameter smaller than that of the large diameter part so as to allow the disks to be fitted over the small diameter part, and includes a cylindrical second bore formed therein which movably receives the clamping shaft.

3. The disk chuck according to claim 2, wherein the piston is axially moved in the cylindrical first bore by a pressurized fluid which is fed into the cylindrical first bore.

4. The disk chuck according to claim 2, further comprising a piston restoring spring which is set in the cylindrical first bore and returns the piston to an original position as a pressurized fluid is removed from the cylindrical first bore.

5. The disk chuck according to claim 2, wherein the piston is axially moved in the cylindrical first bore by pressurized air which is fed into the cylindrical first bore.

6. The disk chuck according to claim 5, further comprising a piston restoring spring which is set in the cylindrical first bore and returns the piston to an original position as the pressurized air is removed from the cylindrical first bore.

7. The disk chuck according to claim 2, further comprising a piston restoring spring which is set in an upper area of the cylindrical first bore and biases the piston to clamp the disks as one of a pressurized fluid and pressurized air is removed from the cylindrical first bore.

8. The disk chuck according to claim 2, wherein:
   the small diameter part further includes a chamfered surface formed on an upper end thereof, wherein an outer diameter of the skirt part extends beyond the outer diameter of the small diameter part in response to the skirt part moving down on the chamfered surface.

9. The disk chuck according to claim 1, wherein:
   the skirt part extends from an upper end of the clamping shaft toward an upper end of the hollow main shaft by a predetermined length, and includes an outer diameter which is larger than that of the clamping shaft; and
   the upper end of the hollow main shaft includes a chamfered surface which causes the skirt part to expand to enlarge the outer diameter of the skirt part and to compress the disks fitted over the hollow main shaft closer together during a downward movement of the clamping shaft.

10. The disk chuck according to claim 9, wherein the outer diameter of the skirt part prior to the downward movement of the clamping shaft is equal to or less than the outer diameter of a small diameter part of the hollow main shaft so as to allow the disks to pass over the skirt part.

11. The disk chuck according to claim 1, further comprising one or more spacers which are fitted over the hollow main shaft at corresponding positions between the disks so as to provide a space between the disks.

12. The disk chuck according to claim 1, further comprising a top cover which covers a portion of an uppermost one of the disks that are fitted over the hollow main shaft.

13. The disk chuck according to claim 12, wherein the top cover clamps the disks in response to a clamping force of the skirt part and prevents damage to the disks.

14. A disk chuck which accommodates disks, comprising:
   a hollow main shaft which seats and receives the disks so as to have the disks fitted over the hollow main shaft;
   a piston which is received in the hollow main shaft and axially moves in the hollow main shaft in opposite directions; and
   a clamping shaft which is axially received in the hollow main shaft, coupled to the piston and moves along with the piston in the same direction so as to clamp and unclamp the disks, wherein an upper end of the clamping shaft is projected from the hollow main shaft and includes a disk clamping part which selectively clamps and unclamps the disks seated on the hollow main shaft, wherein the disk clamping part further comprises:
   an elastic deformable tubular part which extends in an axial direction of the clamping shaft to a predetermined length and includes slits which are axially formed on a sidewall of the elastic deformable tubular part;
   a flange part which extends from an upper end of the elastic deformable tubular part in a radial direction; and
   a skirt part which extends from an outer edge of the flange part toward an upper end of the hollow main shaft by a predetermined length, wherein the upper end of the hollow main shaft includes a chamfered surface which causes the skirt part to expand to enlarge the outer diameter of the skirt part and to compress the disks fitted over the hollow main shaft closer together during a downward movement of the clamping shaft.

15. The disk chuck according to claim 14, wherein the outer diameter of the skirt part prior to the downward movement of the clamping shaft is equal to or less than the outer diameter of a small diameter part of the hollow main shaft so as to allow the disks to pass over the skirt part.

16. The disk chuck according to claim 15, wherein the elastic deformable tubular part provides a restoring force to restore the outer diameter of the skirt part to a diameter prior to the downward movement of the clamping shaft.

17. A disk chuck which accommodates disks, comprising:
   a hollow main shaft which seats and receives the disks so as to have the disks fitted over the hollow main shaft;
   a piston which is received in the hollow main shaft and axially moves in the hollow main shaft in opposite directions;
   a clamping shaft which is axially received in the hollow main shaft, coupled to the piston and moves along with the piston in the same direction so as to clamp and unclamp the disks, wherein an upper end of the clamping shaft is projected from the hollow main shaft and includes a disk clamping part which selectively clamps and unclamps the disks seated on the hollow main shaft; and one or more spacers which are fitted over the hollow main shaft at corresponding positions between the disks so as to provide a space between the disks, wherein each of the spacers further comprises:

an outside member which includes a seat opening having a stepped inner surface;

an inside member which is movably seated in the outside member so as to be retractable relative to the outside member and includes an external top surface having a tapered disk seat surface which fits and centers a corresponding one of the disks;

a spring which is set between the inside and outside members and biases the inside member relative to the outside member so as to expose the tapered disk seat surface of the inside member outside the outside member; and a stop ring which is set in the seat opening of the outside member and prevents removal of the inside member from the outside member.

18. A disk chuck which accommodates disks, comprising:

a hollow main shaft which seats and receives the disks so as to have the disks fitted over the hollow main shaft;

a piston which is received in the hollow main shaft and axially moves in the hollow main shaft in opposite directions;

a clamping shaft which is axially received in the hollow main shaft, coupled to the piston and moves along with the piston in the same direction so as to clamp and unclamp the disks, wherein an upper end of the clamping shaft is projected from the hollow main shaft and includes a disk clamping part which selectively clamps and unclamps the disks seated on the hollow main shaft, wherein the hollow main shaft further comprises:

a large diameter part having an outer diameter and includes a cylindrical first bore formed therein which movably receives the piston, and a small diameter part having an outer diameter smaller than that of the large diameter part so as to allow the disks to be fitted over the small diameter part, and includes a cylindrical second bore formed therein which movably receives the clamping shaft; and a piston restoring spring which is set in a lower area of the cylindrical first bore and biases the piston to unclamp the disks as one of a pressurized fluid and pressurized air is removed from the cylindrical first bore.

19. A disk chuck which accommodates disks, comprising:

a hollow main shaft which seats the disks so as to have the disks fitted over the hollow main shaft;

a piston which axially moves within the hollow main shaft in opposite directions;

a clamping shaft, coupled to the piston, which clamps or unclamps the disks at the same time, wherein an upper end of the clamping shaft is projected from the hollow main shaft and includes a disk clamping part which has an upper dimension changing to clamp or unclamp the disks in response to the movement of the piston; and one or more spacers which are fitted over the hollow main shaft at corresponding positions between the disks to provide a space between the disks, wherein each of the spacers further comprises:

an outside member, and an inside member which is retractably seated in the outside member having a tapered disk seat surface which is biased to be exposed above the outside member, and fits and centers a corresponding one of the disks, wherein the disks are clamped and centered at the same time in response to a downward clamping force of the disk clamping part and an upward biasing force of the tapered disk seat surface.

20. The disk chuck according to claim 19, wherein the hollow main shaft comprises a chamfered surface which is formed on an upper end of the hollow main shaft, and comes into contact to cause the upper dimension of the disk clamping part to enlarge and to compress the disks closer together during a downward movement of the clamping shaft.

21. The disk chuck according to claim 20, wherein the disk clamping part comprises an elastic deformable tubular part which provides a restoring force to restore the upper dimension of the disk clamping part to a dimension prior to the downward movement of the clamping shaft so as to allow the disks to pass over the disk clamping part.

22. The disk chuck according to claim 21, wherein the disk clamping part further comprises slits which are axially formed on a sidewall thereof.

23. The disk chuck according to claim 22, wherein the piston is axially moved in the hollow main shaft by one of pressurized air and a pressurized fluid which is fed into the hollow main shaft.

24. The disk chuck according to claim 23, further comprising a piston restoring spring which is set in the hollow main shaft and returns the piston to an original position as the one of the pressurized air and the pressurized fluid is removed from the hollow main shaft.

* * * * *